United States Patent
Nitawaki et al.

(10) Patent No.: US 8,820,455 B2
(45) Date of Patent: Sep. 2, 2014

(54) COOLING MECHANISM FOR BATTERY PACK OF HYBRID VEHICLE

(71) Applicant: Suzuki Motor Corporation, Shizuoka (JP)

(72) Inventors: Kunihiro Nitawaki, Shizuoka (JP); Koji Takizawa, Shizuoka (JP); Atsushi Horiuchi, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/895,648

(22) Filed: May 16, 2013

(65) Prior Publication Data

US 2013/0319779 A1 Dec. 5, 2013

(30) Foreign Application Priority Data

Jun. 4, 2012 (JP) ................................. 2012-127245

(51) Int. Cl.
*B60R 16/04* (2006.01)
(52) U.S. Cl.
USPC ........................................................ 180/68.5
(58) Field of Classification Search
CPC ........ B60R 16/04; H01M 2/1083; B60S 5/06; B60L 11/1851
USPC .............................................. 180/68.1, 68.5
See application file for complete search history.

(56) References Cited

U.S. PATENT DOCUMENTS

| | | | |
|---|---|---|---|
| 5,249,637 A * | 10/1993 | Heidl et al. | 180/65.25 |
| 5,490,572 A * | 2/1996 | Tajiri et al. | 180/65.1 |
| 6,662,891 B2 * | 12/2003 | Misu et al. | 180/68.1 |
| 6,811,197 B1 * | 11/2004 | Grabowski et al. | 296/37.8 |
| 6,902,020 B2 * | 6/2005 | Kronner et al. | 180/68.5 |
| 7,048,321 B2 * | 5/2006 | Bandoh et al. | 296/37.8 |
| 7,654,351 B2 * | 2/2010 | Koike et al. | 180/68.5 |
| 7,678,494 B2 * | 3/2010 | Tsuchiya | 429/120 |
| 7,688,582 B2 * | 3/2010 | Fukazu et al. | 361/690 |
| 7,819,215 B2 * | 10/2010 | Tsuchiya | 180/68.5 |
| 7,905,308 B2 * | 3/2011 | Abe et al. | 180/68.5 |
| 7,921,951 B2 * | 4/2011 | Watanabe et al. | 180/68.5 |
| 8,016,063 B2 * | 9/2011 | Tsuchiya | 180/68.5 |
| 8,251,169 B2 * | 8/2012 | Fujiwara | 180/68.1 |
| 8,376,074 B2 * | 2/2013 | Yoda | 180/68.5 |
| 8,403,096 B2 * | 3/2013 | Taguchi et al. | 180/291 |

(Continued)

FOREIGN PATENT DOCUMENTS

JP 2001-138753 A 5/2001

*Primary Examiner* — Jeffrey J Restifo
*Assistant Examiner* — Erez Gurari
(74) *Attorney, Agent, or Firm* — Rothwell, Figg, Ernst & Manbeck, P.C.

(57) ABSTRACT

A battery pack cooling mechanism for a hybrid vehicle is provided. An opening is formed in a floor panel located rearwardly of the vehicle. An upper portion of a battery pack inserted into the opening is closed by a cover panel. The opening is formed in misalignment with above an exhaust pipe so that the battery pack is arranged adjacent the exhaust pipe in the width-wise direction of the vehicle. An air-intake device is mounted on a top surface of the battery pack. An air outlet port of the air-intake device opens frontward of the vehicle. An air outlet port of an air outlet duct opens more rearwardly than the battery pack. A filer element which removes foreign substances is disposed in the air-intake device. A service lid is disposed on an upper portion of the cover panel for maintenance of the filter element.

6 Claims, 6 Drawing Sheets

(56) References Cited

U.S. PATENT DOCUMENTS

| | | | |
|---|---|---|---|
| 8,556,017 B2* | 10/2013 | Kubota et al. | 180/68.5 |
| 8,561,743 B2* | 10/2013 | Iwasa et al. | 180/68.5 |
| 2001/0030069 A1* | 10/2001 | Misu et al. | 180/68.1 |
| 2004/0016580 A1* | 1/2004 | Kronner et al. | 180/68.5 |
| 2005/0039964 A1* | 2/2005 | Goyry | 180/243 |
| 2007/0292752 A1* | 12/2007 | Tsuchiya | 429/120 |
| 2008/0047767 A1* | 2/2008 | Tsuchiya | 180/68.5 |
| 2008/0196957 A1* | 8/2008 | Koike et al. | 180/68.5 |
| 2009/0260905 A1* | 10/2009 | Shinmura | 180/68.1 |
| 2010/0273040 A1* | 10/2010 | Kubota et al. | 429/100 |
| 2010/0276220 A1* | 11/2010 | Kubota et al. | 180/68.1 |
| 2010/0294580 A1* | 11/2010 | Kubota et al. | 180/68.1 |
| 2012/0055724 A1* | 3/2012 | Iwasa et al. | 180/68.5 |
| 2012/0160584 A1* | 6/2012 | Nitawaki | 180/68.5 |
| 2013/0075173 A1* | 3/2013 | Kato et al. | 180/68.5 |
| 2013/0140101 A1* | 6/2013 | Lim et al. | 180/68.5 |
| 2013/0319779 A1* | 12/2013 | Nitawaki et al. | 180/68.5 |
| 2013/0319780 A1* | 12/2013 | Nitawaki | 180/68.5 |
| 2013/0327583 A1* | 12/2013 | Nitawaki et al. | 180/68.5 |

* cited by examiner

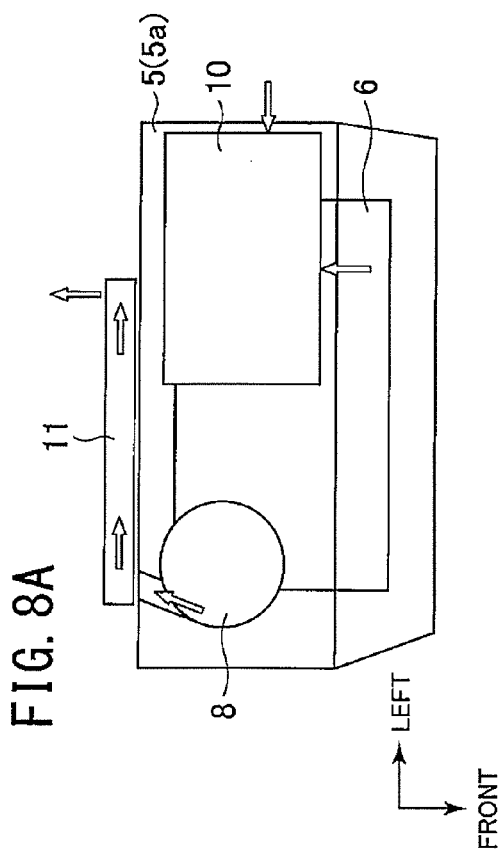
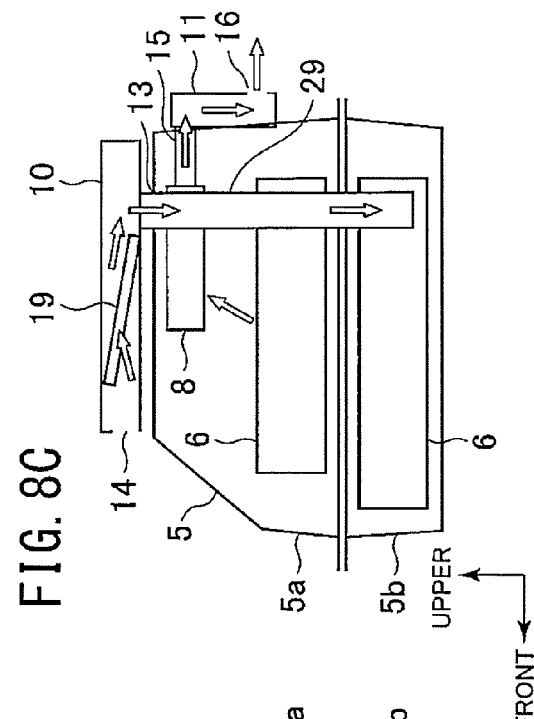
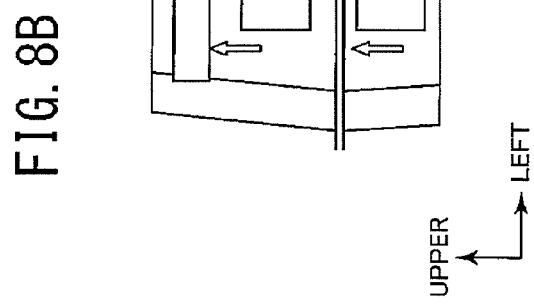

COOLING MECHANISM FOR BATTERY PACK OF HYBRID VEHICLE

CROSS REFERENCE TO RELATED DOCUMENT

The present application claims the benefit of priority of Japanese Patent Application No. 2012-127245 filed on Jun. 4, 2012, the disclosure of which is totally incorporated herein by reference.

BACKGROUND OF THE INVENTION

1. Technical Field of the Invention

The present invention relates generally to a cooling mechanism for a battery pack mounted in hybrid vehicles, and more particularly to an air cooling mechanism designed to introduce outside air to cool battery cells, etc., in a battery pack.

2. Background Art

In order to ensure high efficiency in driving an electric motor that is a drive source, hybrid vehicles usually sets the voltage high, which is to be applied to the motor, so that a high current flows through the motor during operation thereof. This will result in a rise in internal temperature of a battery pack in which batteries (also called battery modules) are disposed. Japanese Patent First Publication, as listed below, teaches a cooling system for a battery pack mounted in such a hybrid vehicle. The hybrid vehicle, as disclosed in this publication, is equipped with a step formed by protruding a floor panel under seats for passengers and has the battery pack and a fuel tank arranged in a width-wise direction of the vehicle below the step. To cool inside the battery pack by introducing outside air through a cooling fan, the battery pack has an air inlet formed on a portion of an upper surface thereof closer to the rear of the vehicle and an air outlet formed on a portion of the upper surface closer to the front of the vehicle. Japanese Patent First Publication No. 2001-138753.

Problem to be Solved by the Invention

The cooling structure, as taught in the above publication, has formed in the upper surface of the battery pack the air inlet for introducing the outside air and the air outlet for the air after having cooled inside the battery, however, the height of the upper surface of the battery pack is small, so that splashes of rainwater or foreign substances may enter the battery pack. The present invention was made in view of the above problem. It is an object to provide a battery pack cooling mechanism for a hybrid vehicle which is designed to avoid intrusion of splashes of rainwater or foreign substances into a battery pack when the battery pack disposed outside a vehicle cabin is cooled by outside air.

Means to Solve the Problem

In order to solve the above problem, there is provided a battery pack cooling mechanism for a hybrid vehicle which comprises: a pair of right and left rear side members which are disposed under a floor panel at a rear portion of a hybrid vehicle and are longitudinal in a front-back direction of the hybrid vehicle; an exhaust pipe which is laid longitudinally along one of the rear side members in the front-back direction of the hybrid vehicle, the exhaust pipe having an open vehicle-rear-end; a battery pack which is arranged next to the exhaust pipe in a width-wise direction of the hybrid vehicle and in which battery pack components are stored; a cooling fan which introduces outside air into the battery pack to cool the battery pack components stored in the battery pack; an opening which opens to the floor panel at a location which does not overlap the exhaust pipe in an upper-lower direction of the hybrid vehicle and in which an upper portion of the battery pack is inserted; a cover panel installed on the floor panel to cover the upper portion of the battery pack; an air inlet port which opens toward a space between a ceiling surface of the cover panel and a top surface of the battery pack to suck the outside air into the battery pack for cooling the battery pack; and an air outlet port from which the air in the battery pack is discharged.

The battery pack cooling mechanism further includes a sub-frame on which the battery pack is mounted and which has side portions arrayed in the width-wise direction of the hybrid vehicle, the side portions being joined to the rear side members, respectively. The sub-frame is equipped with a connecting frame which is disposed between a side edge of the opening and the exhaust pipe above the exhaust pipe in the upward direction of the hybrid vehicle and longitudinal in the front-back direction of the hybrid vehicle.

The battery pack cooling mechanism further includes an air-intake device which is mounted on a top surface of the battery pack and communicates between an air inlet through which the outside air is taken into the battery pack and the air inlet port. The inlet port opens frontward of the hybrid vehicle at a location next to the front edge of the top surface of the battery pack.

The air-intake device includes a body and a cover which are separable vertically. A filter element which removes a foreign substance contained in the air is disposed between the body and the cover.

A service lid used for maintenance of the filter element is so disposed as to form a ceiling surface of the cover panel.

The air outlet port opens rearwardly of the hybrid vehicle at a location closer to the rear of the vehicle than a vehicle-backward wall of the battery pack is. An air outlet duct which communicates between an air-discharge outlet from which the air in the battery pack is discharged and the air outlet port is mounted on the vehicle-backward wall of the battery pack.

Effect of the Invention

According to one aspect of the invention, the pair of right and left rear side members which are longitudinal in the front-back direction of the hybrid vehicle are disposed under the floor panel at the rear portion of the hybrid vehicle. The exhaust pipe which has the open vehicle-rear-end is arranged longitudinally along one of the rear side members in the front-back direction of the hybrid vehicle. The battery pack in which the battery pack components are stored is arranged next to the exhaust pipe in the width-wise direction of the hybrid vehicle. The cooling fan works to introduce the outside air into the battery pack to cool the battery pack components stored in the battery pack. The opening in which the upper portion of the battery pack is inserted is formed in the floor panel at the rear portion of the hybrid vehicle. The cover panel is installed on the floor panel so as to cover the upper portion of the battery pack. The air inlet port through which the outside air is sucked into the battery pack for cooling the battery pack is oriented to open toward the space between the ceiling surface of the cover panel and the top surface of the battery pack. The air outlet port from which the air in the battery pack is discharged is provided. This permits the height of the air inlet port for sucking the outside air to be increased and blocks splashes of rainwater coming from underneath the battery pack by the battery pack, the floor panel, and the cover panel to avoid the entrance of the rainwater or foreign substances from the air inlet port into the battery pack. The opening into which the upper portion of the battery pack is inserted is offset or deviates from above the exhaust pipe in the width-wise direction of the hybrid vehicle, so that the exhaust gas emitted from the exhaust pipe or the air heated by the exhaust pipe hardly enters the space between the ceiling surface of the cover panel and the top surface of the battery pack. The outside air taken from the air inlet port is, therefore, hardly warmed, thus resulting in improvement in cooling the battery pack and avoiding the corrosion of the battery pack resulting from the exhaust emissions from the exhaust pipe, which will improve the durability of the battery pack.

The battery pack is mounted on the sub-frame with the side portions which are arrayed in the width-wise direction of the hybrid vehicle and joined to the rear side members, respectively. The connecting frame which is longitudinal in the front-back direction of the hybrid vehicle is disposed between the side edge of the opening and the exhaust pipe above the exhaust pipe in the upward direction of the hybrid vehicle. The exhaust gas from the exhaust pipe or air heated by the exhaust pipe, thus, does not enter the space between the ceiling surface of the cover panel and the top surface of the battery pack. This causes the outside air taken into the battery pack to be hardly warmed, thus resulting in further improvement in cooling the battery pack and avoiding the corrosion of the battery pack due to exhaust emissions from the exhaust pipe, which will enhance the durability of the battery pack further.

The air-intake device which communicates between the air inlet through which the air is taken into the battery pack and the air inlet port is mounted on the top surface of the battery pack. The air inlet port is oriented to open in the frontward direction of the vehicle at a location next to the front edge of the top surface of the battery pack. This causes drops of rainwater which have splashed up above the battery pack in front of the air inlet port in the frontward direction of the vehicle to fall down in front of the battery pack, thus avoiding the entrance of the drops of rainwater into the air inlet port. The air inlet port opens in a direction opposite in a direction in which the rear end of the exhaust pipe opens, thereby also avoiding the entrance of exhaust gas, as emitted from the exhaust pipe, into the air inlet port.

The air-intake device is made up of the body and the cover which are separable up and down. The filter element which serves to remove foreign substances contained in the air is placed between the body and the cover. This avoids the entrance of foreign substances into the battery pack.

The service lid used for maintenance work on the filter element is so disposed as to form the ceiling surface of the cover panel, thereby improving the workability of the maintenance of the filter element.

The air outlet port is oriented to open rearwardly of the hybrid vehicle at a location closer to the rear of the hybrid vehicle than the vehicle-backward wall of the battery pack is. The air outlet duct which communicates between the air-discharge outlet from which the air in the battery pack is discharged and the air outlet port is laid on the vehicle-backward wall of the battery pack, so that warm air, as emitted from the air outlet port, hardly enters the space between the ceiling surface of the cover panel and the top surface of the battery pack. The outside air taken from the air inlet port is, therefore, hardly warmed, thus further improving the cooling of the battery pack.

BRIEF DESCRIPTION OF THE DRAWINGS

FIG. 8A is a plan view which illustrates a battery pack cooling mechanism;

FIG. 8B is a front view of FIG. 8A; and

FIG. 8C is a side view of FIG. 8A.

EMBODIMENT CARRYING OUT THE INVENTION

Figure 1:
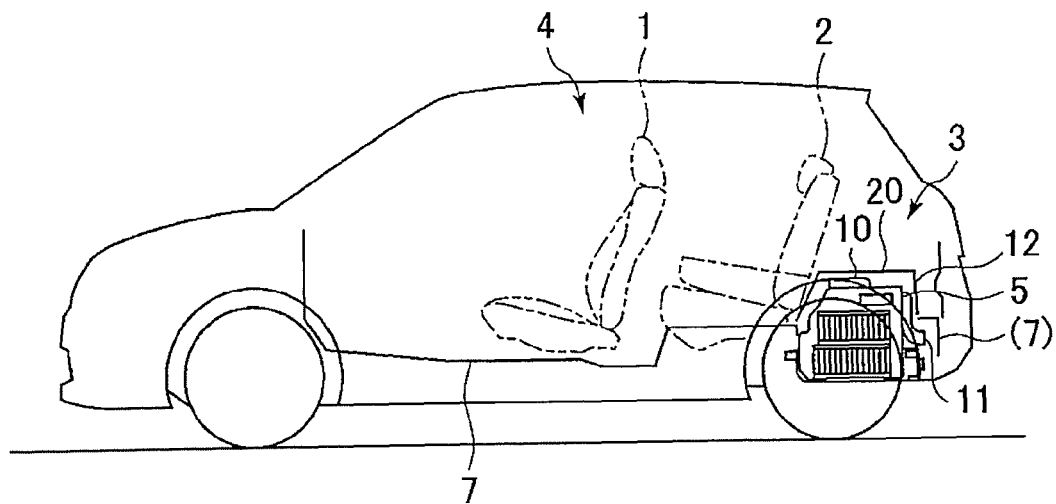
FIG. 1 is a longitudinal left side vertical section of a schematic structure of a hybrid vehicle which illustrates an embodiment of a battery pack cooling mechanism of the invention.
Figure 2:
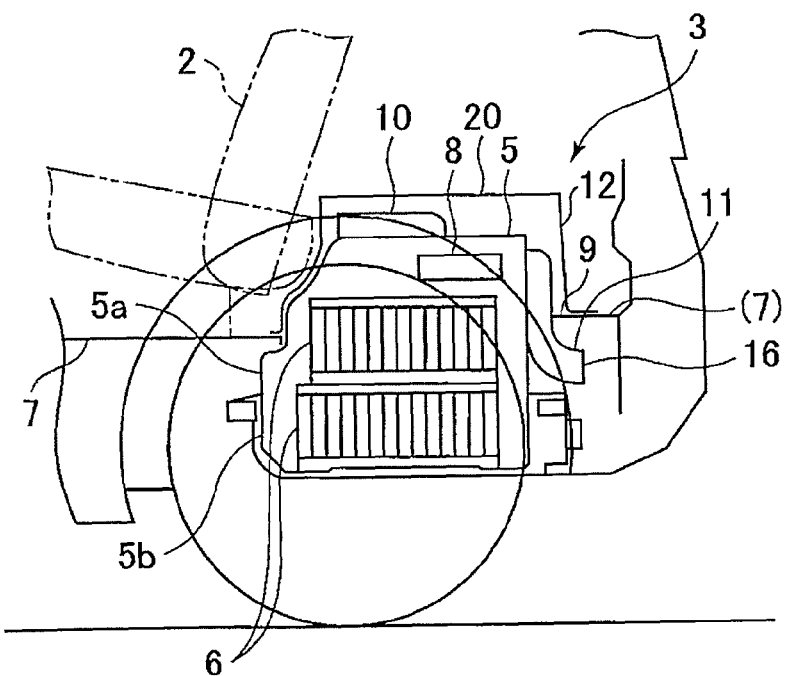
FIG. 2 is a detail view of a mount portion of a battery pack of FIG. 1.

An embodiment of a battery pack cooling mechanism for hybrid vehicles according to the invention will be described below with reference to drawings. FIG. 1 is a vertical section view which illustrates a left side of a hybrid vehicle equipped with the battery pack cooling mechanism of this embodiment. FIG. 2 is a detail view of a battery pack mounted in the hybrid vehicle of FIG. 1. The hybrid vehicle is a small-sized double-row seat vehicle with front seats 1 and rear seats 2. A typical trunk 3 also called a luggage compartment is provided behind a cabin 4. In this embodiment, a battery pack 5 is mounted beneath the trunk 3 outside the cabin 3. A casing of the battery pack 5 is, as illustrated in FIG. 2, is made of a combination of an upper case 5a and a lower case 5b. The battery pack 5 has disposed therein battery pack components 6 (i.e., battery cells, electric components, and battery modules) which work to produce electric power to drive an electric motor (not shown) to output drive torque for the hybrid vehicle. The battery pack 5 has installed therein a cooling fan 8 which serves to take in outside air to cool the battery pack components 6. The hybrid vehicle is also equipped with an engine (not shown).

Figure 3:
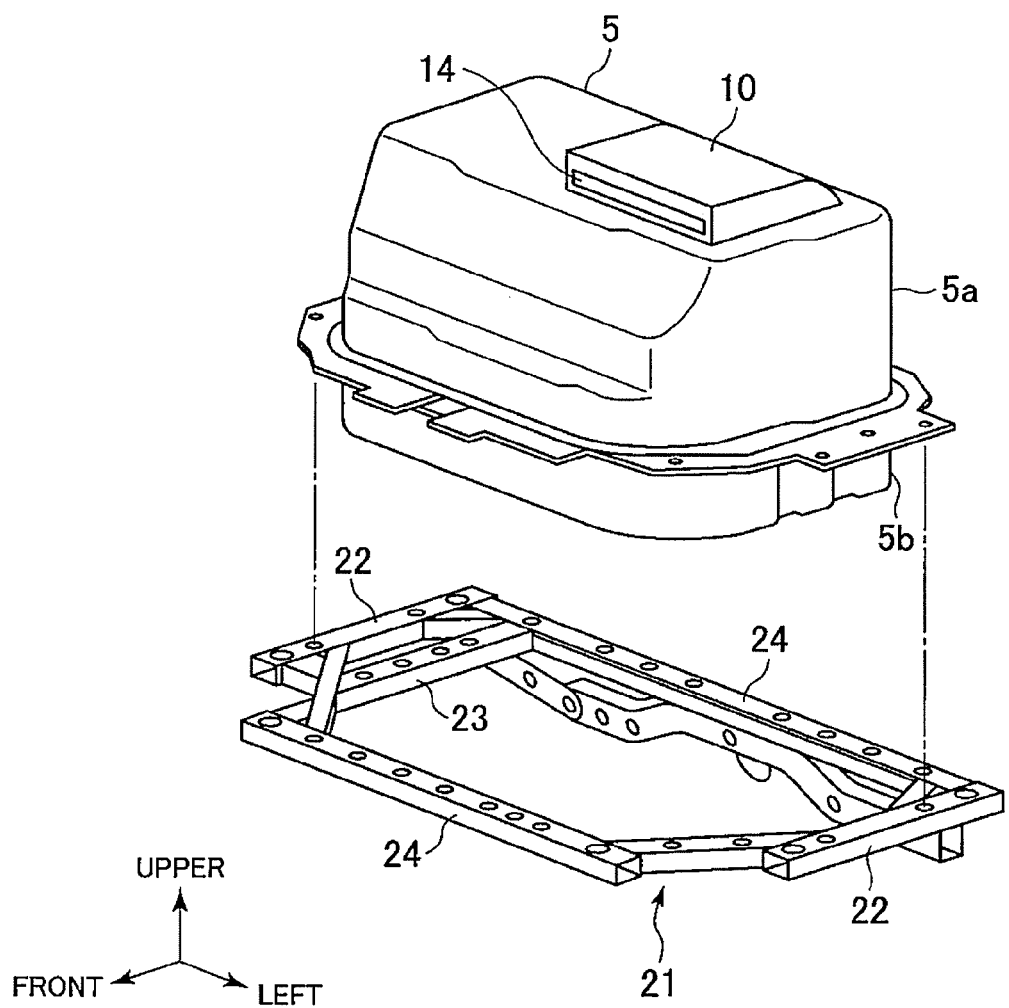
FIG. 3 is a perspective view of a sub-frame on which a battery pack is mounted.

A floor pane 7 is mounted under the cabin 4 and the trunk 3. The floor panel 7 forms a floor of the cabin 4 and the trunk 3 and extends continuously from the front of the cabin 4, i.e., a dash panel to the rear of the trunk 3. In this embodiment, an opening 9 is formed on a portion of the floor panel 7 which is located behind the rear seats 2 within the trunk 3. An upper portion of the battery pack 5 is inserted into the opening 9. The battery pack 5 which is mounted, as illustrated in FIG. 3, on a sub-frame 21 is installed in a body of the hybrid vehicle, so that it passes through the opening 9 of the floor panel 7 in an upper-lower direction or vertical direction of the hybrid vehicle. The upper portion of the battery pack 5 protruding outside the opening 9 of the floor panel 7 is covered with a cover panel 12. The cover panel 12 is secured at a lower portion thereof to the floor panel 7.

The battery pack 5 is, as illustrated in FIG. 3, mounted on the sub-frame 21. The sub-frame 21 includes two cross frames 24 which are arranged in a front-back direction of the hybrid vehicle and longitudinal in a width-wise direction of the hybrid vehicle and two side frames 22 which are arrayed in the width-wise direction and longitudinal in the front-back direction. The installation of the battery pack 5 beneath the trunk 3 outside the cabin 4 is achieved by attaching the right and left side frames 22 to right and left rear side members, as will be described later. A connecting frame 23 which is longitudinal in the front-back direction of the hybrid vehicle and forms a portion of the side frame 22 on the right side of the hybrid vehicle is disposed inside that side frame 22.

Figure 4:
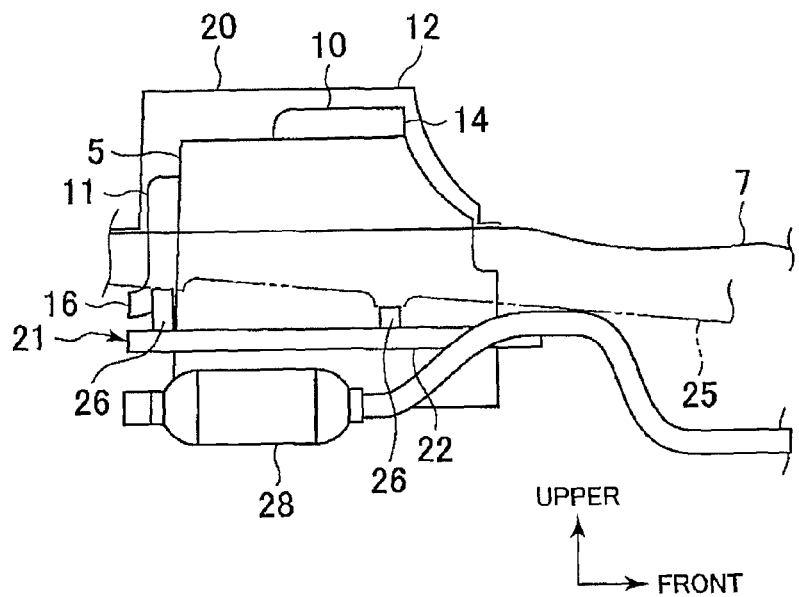
FIG. 4 is a right side view of a sub-frame installed on rear side members.
Figure 5:
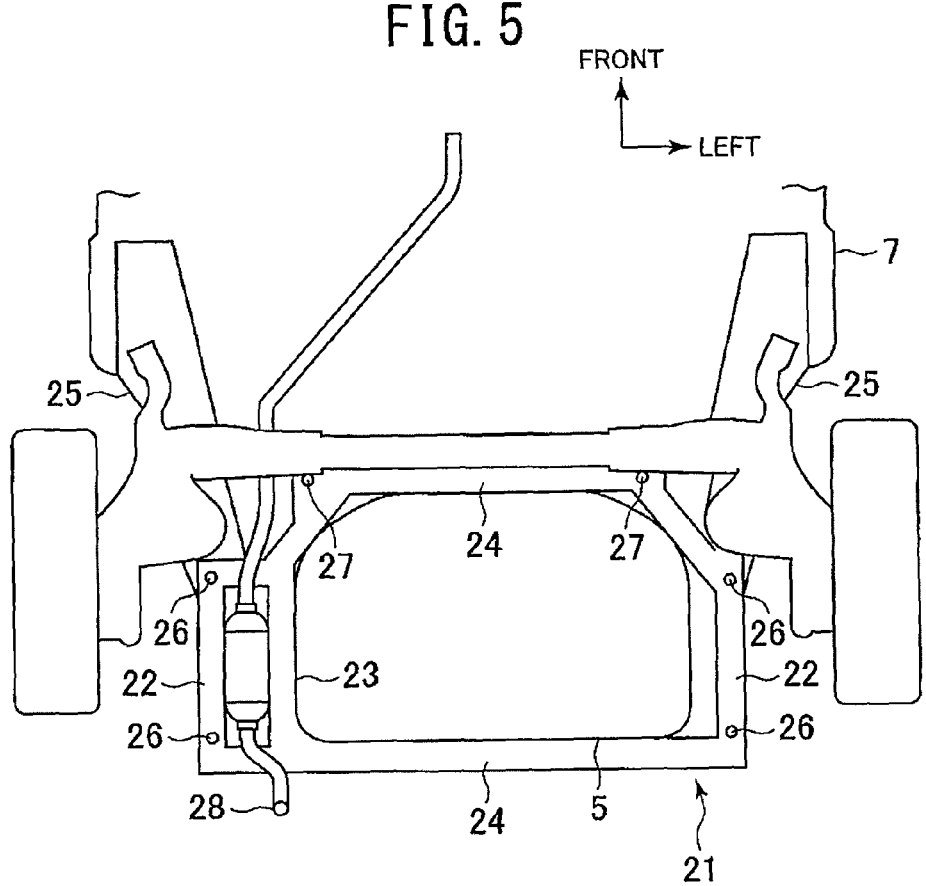
FIG. 5 is a bottom view of a sub-frame installed on rear side members.
Figure 6:
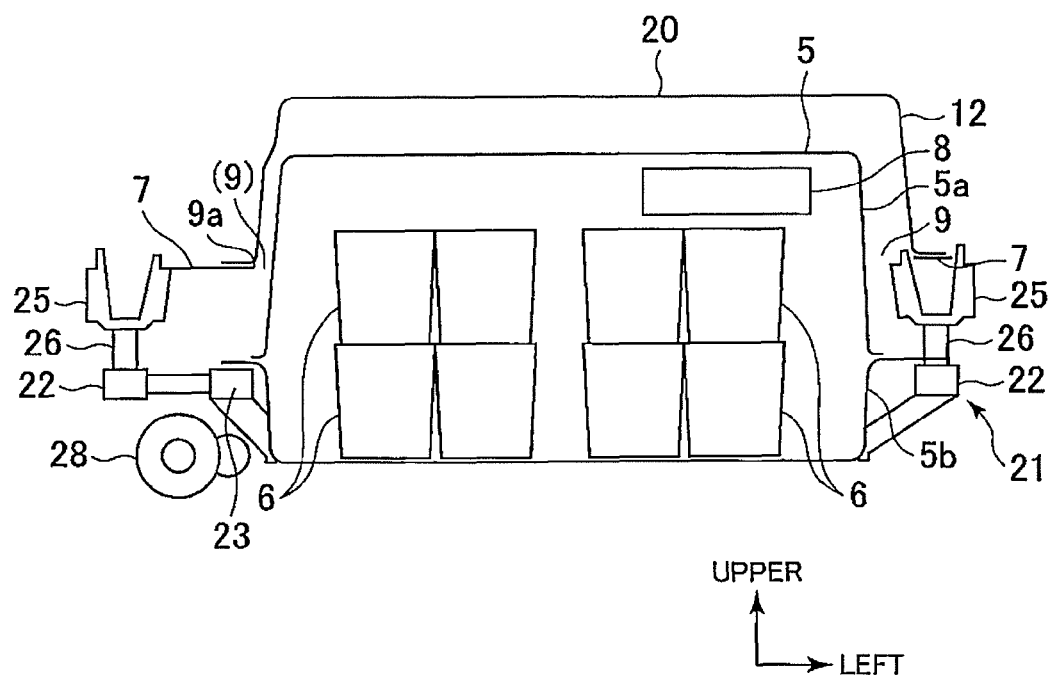
FIG. 6 is a front view of a sub-frame installed on rear side members.

FIG. 4 is a right side view of the rear side members 25 to which the sub-frame 21 is secured. FIG. 5 is a bottom view of the rear side members 25 on which the sub-frame 21 is installed. FIG. 6 is a front view of the rear side members 25 on which the sub-frame 21 is installed. The rear side members 25 are disposed as a pair beneath the floor panel 7 on the rear portion of the vehicle. In this embodiment, each of the right and left side frames 22 of the sub-frame 21 is joined at two places to one of the right and left rear side members 25 through connecting members 26. The front cross frame 25 of the sub-frame 21 are joined to a member of the floor panel 7 through connecting members 27.

The opening 9 formed in the floor panel 7, as can be seen from, for example, FIG. 6, deviates or is offset from above an exhaust pipe 28 in the width-wise direction of the vehicle. The exhaust pipe 28 has an end which opens to the rear of the vehicle and from which exhaust gas is emitted. The exhaust pipe 28 is laid along the rear side member 25 located on the right side of the vehicle. The battery pack 5 is, thus, located next to the exhaust pipe 28 in the width-wise direction of the vehicle. The battery pack cooling mechanism of this embodiment, as described later, introduces outside air through space between the ceiling surface of the cover panel 12 and the top surface of the battery pack 5 to cool inside the battery pack 5. The deviation of the opening 9 of the floor panel 7 from above the exhaust pipe 28 causes the exhaust gas emitted from the exhaust pipe 28 or the air heated by the exhaust pipe 28 to hardly enter the space between the ceiling surface of the cover panel 12 and the top surface of the battery pack 5. The outside air taken into the battery pack 5 is, therefore, hardly warmed, thus resulting in improvement in cooling the battery pack 5 and avoiding corrosion thereof due to exhaust emissions from the exhaust pipe 28, which will improve the durability of the battery pack 5.

The connecting frame 23 of the sub-frame 21 is, as illustrated in FIG. 6, disposed between a portion of a side edge 9a of the opening 9 which is located above the exhaust pipe 28 closer to the exhaust pipe 28 in the width-wise direction of the vehicle and the exhaust pipe 28. The connecting frame 23 disturbs an updraft of air warmed by the exhaust gas from the exhaust pipe 28 or directly the exhaust pipe 28, so that it hardly enters the space between the ceiling surface of the cover panel 12 and the top surface of the battery pack 5. This causes the outside air taken into the battery pack 5 to be hardly warmed, thus resulting in further improvement in cooling the battery pack 5 and avoiding corrosion thereof due to exhaust emissions from the exhaust pipe 28, which will enhance the durability of the battery pack 5 further.

Figure 7:
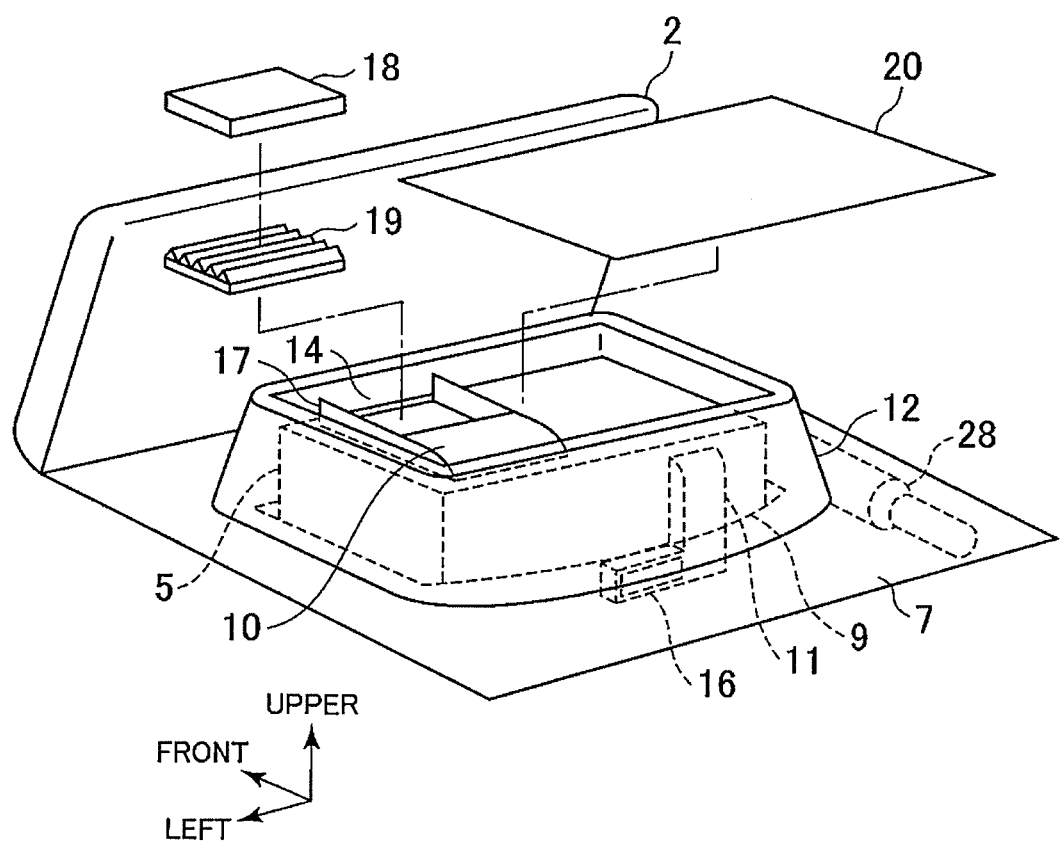
FIG. 7 is a perspective view of an air-intake device and a cover panel in FIG. 1.

An air-intake device 10 which works to introduce the outside air into the battery pack 5 is, as clearly illustrated in FIGS. 7 to 8(C), disposed above the top surface of the battery pack 5. An air outlet duct 11 from which air in the battery pack 5 is discharged is mounted on a vehicle-backward wall of the battery pack 5. The air-intake device 10, as can be seen in FIGS. 8(A) to 8(C), connects between an air inlet 13 through which air is taken into the battery pack 5 and an air inlet port 14 of the air-intake device 10. The above described cooling fan 8 is mounted close to an air outlet 15 within the battery pack 5. The air inlet 13 of the battery pack 5 and the battery pack components 6 are joined through an inside duct 29.

The air inlet port 14 of the air-intake device 10 opens to the front of the vehicle at a location next to the front edge of the top surface of the battery pack 5. The air outlet port 16 of the air outlet duct 11 opens rearwardly of the vehicle at a location closer to the rear of the vehicle than the vehicle-backward wall of the battery pack 5 is. In other words, the air outlet port 16 opens in a direction opposite a direction in which the air inlet port 14 opens, thus avoiding the introduction of warm air emitted from the air outlet port 16 from the air inlet port 14.

The air-intake device 10 is made up of a top surface-side body 17 of the battery pack 5 which is separable up and down and a cover 18 disposed on the body 17. A filter element 19 which removes foreign substances contained in the air is placed between the body 17 and the cover 18. The outside air, as introduced from the air inlet port 14, passes, as indicated by arrows in FIGS. 8(A) to 8(C), through the filter element 19 in the air-intake device 10 and enters the battery pack 5 through the air inlet 13. The foreign substances contained in the outside air are captured by the filter element 19. The outside air, as taken into the battery pack 5, passes through the inside duct 29 and reaches the battery pack components 6 to cool them. The air after having cooled the battery pack components 6 flows through the cooling fan 8, passes through the air outlet duct 11 from the air outlet 15, and is then discharged from the air outlet port 16.

A ceiling board (or a ceiling surface) of the cover panel 12 is detachable. The ceiling board is a service lid 20. The maintenance of the above described filter element 19 is accomplished by opening the service lid 20 of the cover panel 12 and then opening the cover 18 of the air-intake device 10. After the maintenance of the filter element 19, the cover 18 of the air-intake device 10 is closed, and then the service lid 20 of the cover panel 12 is closed. The service lid 20 facilitates ease of maintenance of the filter element 19.

In the battery pack cooling mechanism for the hybrid vehicle of this embodiment, the pair of two rear side members 25 which are longitudinal in the front-back direction of the vehicle is disposed under the floor panel 7 at the rear portion of the vehicle. The exhaust pipe 28 which has the open vehicle-rear-end is laid longitudinally along one of the rear side members 25 in the front-back direction of the vehicle. The battery pack 5 in which the battery pack components 6 are disposed is placed next to the exhaust pipe 28 in the width-wise direction of the vehicle. The outside air is taken by the cooling fan 8 into the battery pack 5 to cool the battery pack components 6. The opening 9 into which the upper portion of the battery pack 5 is inserted is formed in a vehicle rear-side portion of the floor panel 7. The cover panel 12 is installed on the floor panel 7 so as to cover the upper portion of the battery pack 5 protruding upwardly from the opening 9. The air inlet port 14 through which the cooling outside air is to be sucked into the battery pack 5 opens toward the space between the ceiling surface of the cover panel 12 and the top surface of the battery pack 5. The air outlet port 16 from which the air in the battery pack 5 is emitted is provided. This permits the height of the air inlet port 14 for sucking the outside air to be increased and blocks splashes of rainwater coming from underneath the battery pack 5 by the battery pack 5, the floor panel 7, and the cover panel 12 to avoid the entrance of the rainwater or foreign substances from the air inlet port 14 into the battery pack 5.

The opening 9 into which the upper portion of the battery pack 5 is inserted is offset from above the exhaust pipe 28 in the width-wise direction of the vehicle, so that the exhaust gas emitted from the exhaust pipe 28 or the air heated by the exhaust pipe 28 hardly enters the space between the ceiling surface of the cover panel 12 and the top surface of the battery pack 5. The outside air taken into the battery pack 5 is, therefore, hardly warmed, thus resulting in improvement in cooling the battery pack 5 and avoiding the corrosion of the battery pack 5 arising from the exhaust emissions from the exhaust pipe 28, which will improve the durability of the battery pack 5.

The battery pack 5 is mounted on the sub-frame 21 in which the side frames 22 located on both sides of the vehicle in the width-wise direction of the vehicle are coupled to the rear side members 25, respectively, and the connecting frame 23 of the sub-frame 21 longitudinal in the front-back direction of the vehicle is disposed between the side edge of the opening 9 which is located above the exhaust pipe 28 closer to the exhaust pipe 28 and the exhaust pipe 28. The exhaust gas from the exhaust pipe 28 or air heated by the exhaust pipe 28, thus, does not enter the space between the ceiling surface of the cover panel 12 and the top surface of the battery pack 5. This causes the outside air taken into the battery pack 5 to be hardly warmed, thus resulting in further improvement in cooling the battery pack 5 and avoiding the corrosion of the battery pack 5 due to exhaust emissions from the exhaust pipe 28, which will enhance the durability of the battery pack 5 further.

The air-intake device 10 which establishes communication between the air inlet 13 through which air is taken into the battery pack 5 and the air inlet port 14 is mounted on the top surface of the battery pack 5. The air inlet port 14 is oriented to open in the frontward direction of the vehicle at a location next to the front edge of the top surface of the battery pack 5. This causes drops of rainwater which have splashed up above the battery pack 5 in front of the air inlet port 14 in the frontward direction of the vehicle to fall down in front of the battery pack 5, thus avoiding the entrance of the splashes of rainwater into the air inlet port 14. The air inlet port 14 opens in a direction opposite in a direction in which the rear end of the exhaust pipe 28 opens, thereby also avoiding the entrance of exhaust gas, as emitted from the exhaust pipe 18, into the air inlet port 14.

The air-intake device 10 is made up of the body 17 which is separable downwardly and the cover 18. The filter element 19 which removes foreign substances contained in the air is placed between the body 17 and the cover 18. This avoids the entrance of foreign substances into the battery pack 5.

The service lid 20 used for maintenance work on the filter element 19 is so disposed as to form the ceiling surface of the cover panel 12, thereby improving the workability of the maintenance of the filter element 19.

The air outlet port 16 opens rearwardly of the vehicle at a location closer to the rear of the vehicle than the vehicle-backward wall of the battery pack 5 is. The air outlet duct 11 which communicates between the air outlet 15 from which the air in the battery pack 5 is discharged and the air outlet port 16 is laid on the vehicle-backward wall of the battery pack 5, so that warm air, as emitted from the air outlet port 16, hardly enters the space between the ceiling surface of the cover panel 12 and the top surface of the battery pack 5. The outside air taken from the air inlet port 14 is, therefore, hardly warmed, thus further improving the cooling of the battery pack 5.

What is claimed is:

1. A battery pack cooling mechanism for a hybrid vehicle comprising:
   a pair of right and left rear side members which are disposed under a floor panel at a rear portion of a hybrid vehicle and are longitudinal in a front-back direction of the hybrid vehicle; an exhaust pipe which is laid longitudinally along one of said rear side members in the front-back direction of the hybrid vehicle, said exhaust pipe having an open vehicle-rear-end;
   a battery pack which is arranged next to said exhaust pipe in a width-wise direction of the hybrid vehicle and in which battery pack components are stored;
   a cooling fan which introduces outside air into said battery pack to cool the battery pack components stored in said battery pack;
   an opening which opens to said floor panel at a location which does not overlap said exhaust pipe in an upward direction of the hybrid vehicle and in which an upper portion of said battery pack is inserted;
   a cover panel installed on said floor panel to cover the upper portion of said battery pack;
   an air inlet port which opens toward a space between a ceiling surface of said cover panel and a top surface of said battery pack to introduce the outside air into said battery pack for cooling said battery pack; and
   an air outlet port from which the air in said battery pack is discharged.

2. A battery pack cooling mechanism as set forth in claim 1, further comprising a sub-frame on which said battery pack is mounted and which has side portions arrayed in the width-wise direction of the hybrid vehicle, the side portions being joined to said rear side members, respectively, and wherein said sub-frame is equipped with a connecting frame which is disposed between a side edge of said opening and said exhaust pipe above said exhaust pipe in the upper-lower direction of the hybrid vehicle and longitudinal in the front-back direction of the hybrid vehicle.

3. A battery pack cooling mechanism as set forth in claim 1, further comprising an air-intake device which is mounted on a top surface of the battery pack and communicates between an air inlet through which the outside air is taken into said battery pack and said air inlet port, and wherein said air inlet port opens frontward of the hybrid vehicle at a location next to the front edge of the top surface of said battery pack.

4. A battery pack cooling mechanism as set forth in claim 3, wherein said air-intake device includes a body and a cover which are separable up and down, and wherein a filter element which removes a foreign substance contained in the air is disposed between said body and the cover.

5. A battery pack cooling mechanism as set forth in claim 4, wherein a service lid used for maintenance of said filter element is so disposed as to form a ceiling surface of said cover panel.

6. A battery pack cooling mechanism as set forth in claim 1, wherein said air outlet port opens rearwardly of the hybrid vehicle at a location closer to the rear of the vehicle than a vehicle-backward wall of said battery pack is, and an air outlet duct which communicates between an air-discharge outlet from which the air in said battery pack is discharged and said air outlet port is mounted on the vehicle-backward wall of said battery pack.

* * * * *